Patented Sept. 6, 1949

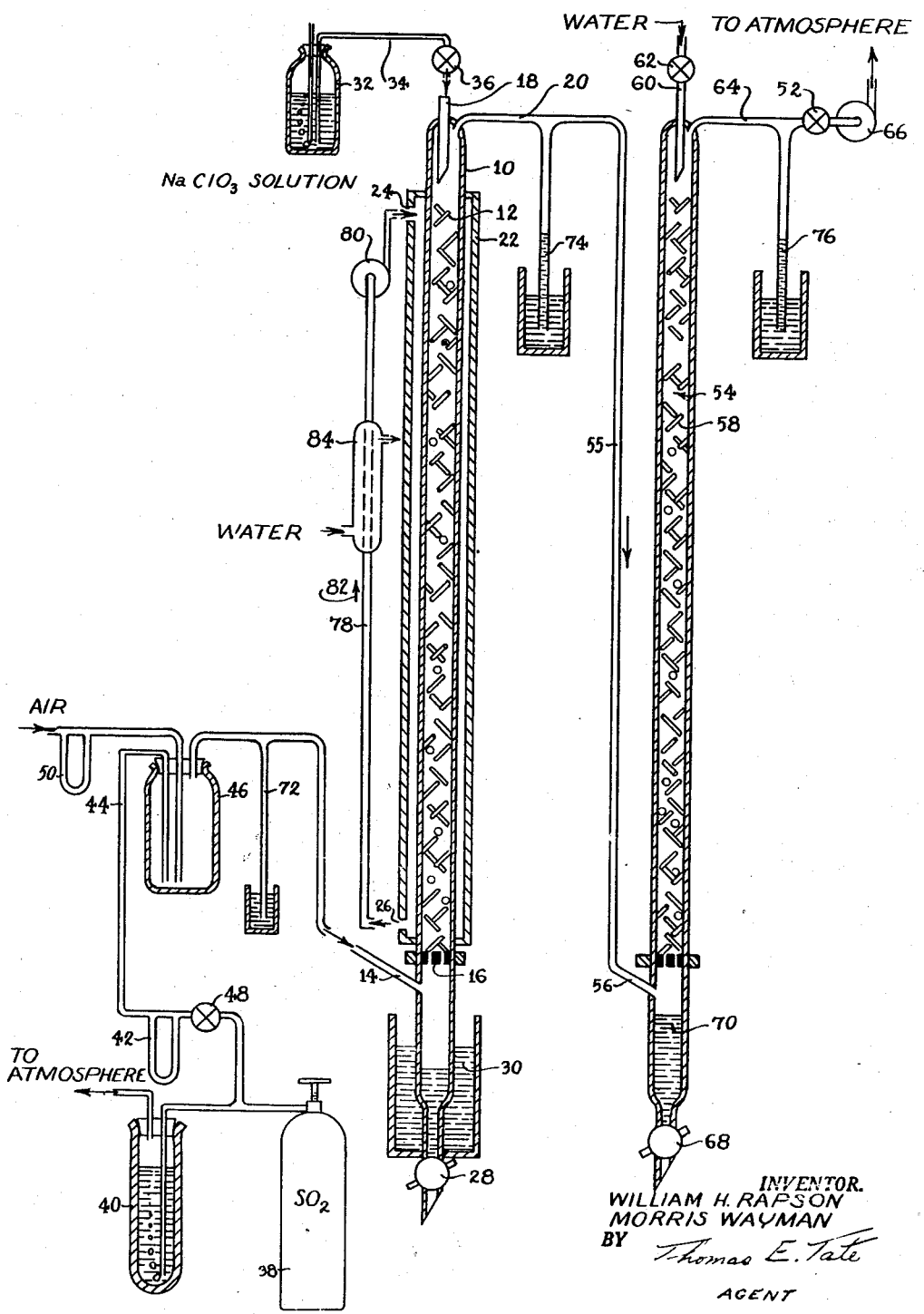

2,481,240

UNITED STATES PATENT OFFICE 2,481,240

METHOD FOR PRODUCING CHLORINE DIOXIDE

William Howard Rapson and Morris Wayman, Hawkesbury, Ontario, Canada, assignors to Canadian International Paper Company, Montreal, Quebec, Canada, a corporation of Quebec, Canada Application January 11, 1946, Serial No. 640,592

8 Claims. (Cl. 23—152)

This invention relates to the manufacture of chloride dioxide and more particularly to the manufacture of chlorine dioxide in a continuous process.

It is known that chlorine dioxide may be formed as a result of the reaction between sulphur dioxide and an aqueous solution of a chlorate, but all processes of which we are aware are batch processes which involve the bubbling of $SO_2$, preferably diluted with air or nitrogen or other inert gas, through a volume of chlorate solution in a suitable container from which the evolved chlorine dioxide may be removed. Obviously, in any such procedure the reaction between the gas and the chlorate occurs under progressively changing conditions. For example, the chlorate solution must become saturated with respect to chlorine dioxide before any of this gas will be evolved. Furthermore, the concentrations of the chlorate solution and the by-products are subject to constant change throughout the operation.

When gaseous $SO_2$ is brought into contact with an aqueous solution of sodium chlorate, for example, a number of reactions occur. Chlorine dioxide is produced in accordance with the following equation:

(1) 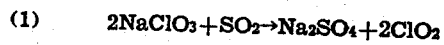

The chlorate is also reduced to chloride as follows:

(2) 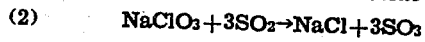

A number of side reactions occur which result in the production, among other things, of chlorine, sulphuric acid, hydrochloric acid and sodium acid sulphate.

Proper conditions may be established which favor the production of chlorine dioxide, but the other products will always occur to a greater or less extent. In the batch processes of the prior art it is clearly impossible to establish and maintain those conditions which are most favorable for the production of chlorine dioxide because of the constantly decreasing concentration of chlorate and the increasing concentration of other products, some of which favor the production of chlorine. Accordingly, it is not at all possible to convert substantially all of the chlorine available in the chlorate to the desired form.

In accordance with the present invention the apparatus and process enable us to produce chlorine dioxide in a continuous manner and to establish and maintain those conditions most favorable for the production of the greatest possible percentage of chlorine dioxide. A very much greater portion of the available chlorine is thus converted into chlorine dioxide and the cost of producing this valuable gas is very greatly reduced.

As a result of our invention it is possible to produce a continuous flow of chlorine dioxide at exactly the rate necessary for use of the gas in some continuous processing plant, as, for example, a pulp mill in which a continuous refining, bleaching or purifying process is in operation. In this latter connection chlorine dioxide has properties which would make it a valuable processing chemical in the production of high alpha pulp and high brightness, high strength paper pulp. However, because of its highly instable nature and because it has heretofore been produced only in batches it has not been practicable to make use of this gas.

It is therefore an object of the present invention to provide apparatus and process for the continuous production of chlorine dioxide by the reaction between sulphur dioxide and an aqueous solution of a metallic chlorate. Other and further objects of the present invention will become apparent upon a consideration of the following detailed disclosure taken in connection with the drawings in which is diagrammatically illustrated one embodiment of suitable apparatus.

We have found that chlorine dioxide may be produced continuously and efficiently from concentrated sodium chlorate solution and sulphur burner gas generally containing about 15% to 18% sulphur dioxide by passing these two reactants, preferably countercurrently, through a tower packed with Raschig rings or other suitable packing. The present process is believed to be the first in which a reactive gas is made to react with a solution in a packed column to produce another gas with which the original gas will react. In the present case the $SO_2$ is reactive with the chlorine dioxide and it would be throught that such reaction would render this process inoperative. However, we have found that when sodium chlorate solution is allowed to trickle down over the tower packing to expose an enormous surface of the thinly spread solution to the sulphur dioxide and air mixture, the sulphur dioxide reacts more rapidly with the chlorate than with the chlorine dioxide. Furthermore, we control the temperature in those portions of the tower where relatively high concentrations of sulphur dioxide and chlorine dioxide are mixed whereby to minimize the reaction between these gases.

Naturally there is a tendency in this apparatus toward the formation of chlorine and under certain conditions of operation, which in many instances may be the most desirable, the evolved gas will comprise a mixture of a relatively high percentage of chlorine dioxide, a relatively lower percentage of chlorine and a large percentage of diluent gas which may comprise air, or where sulphur burner gas is used, air and nitrogen.

Where the gas is to be used in bleaching cellulosic material it may be preferred to make use of a mixture of chlorine dioxide and chlorine. In other instances it may be preferred to make use of chlorine dioxide substantially free from chlorine. The present invention may be used in either of these manners. Thus we are able to produce a gaseous mixture of chlorine dioxide and chlorine with the proportion between these two gases which is most desirable for a particular use. It is possible to reduce the chlorine evolved from the apparatus to substantially zero and thus to produce substantially pure chlorine dioxide diluted only with air or air and nitrogen. This is a particularly valuable feature of the present invention inasmuch as great flexibility is available by mere adjustment of the relative quantities of materials supplied to the apparatus.

Reference may also be made to our copending application Ser. No. 647,994, filed February 15, 1946, in which we disclosed and claimed a method for removing chlorine from a gaseous mixture of chlorine dioxide and chlorine by the use of $SO_2$ either in pure form or in the form available from a sulphur burner. The principles of that discovery may be applied to the present invention by supplying $SO_2$ to the packed column at such a rate that a small amount of $SO_2$ passes completely through the column and is carried over with the chlorine dioxide produced in the column.

Since under the conditions described herein the chlorine which is produced reacts with $SO_2$ in the presence of water vapor much more rapidly than does the chlorine dioxide, substantially all of the chlorine may be removed with but little loss of chlorine dioxide. The reactions just mentioned are set forth hereinbelow:

(3) 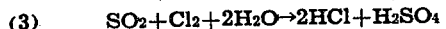
$$SO_2+Cl_2+2H_2O \rightarrow 2HCl+H_2SO_4$$

(4) 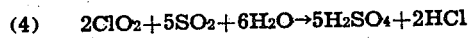
$$2ClO_2+5SO_2+6H_2O \rightarrow 5H_2SO_4+2HCl$$

Referring now to the drawing in which is illustrated a preferred embodiment of apparatus incorporating our invention, reference numeral 10 indicates a reaction tower or column which is packed with Raschig rings or other suitable packing material 12. The reaction column 10 is provided with an inlet 14 at the bottom at a point below the support 16 for the column packing. The column 10 is provided with an inlet 18 and an outlet 20 at its upper end.

The column 10 is surrounded by a water jacket 22 having an inlet 24 at its upper end and an outlet 26 at its lower end. It is believed apparent that forms of heat exchanging devices, other than the simple water jacket described above, may be employed if desirable.

At its extreme lower end the column 10 is provided with a valve 28 for withdrawal of accumulated liquids. This lower portion of the column may be inserted in a water bath 30 which maintains the effluent liquor at proper temperature to prevent crystallization thereof.

Concentrated sodium chlorate solution is conducted from a constant head bottle 32 by gravity flow through suitable glass, rubber or other tubing 34 to the inlet 18 in the reaction column 10. An adjustable valve 36 is located in the tube 34 for the purpose of establishing a desired rate of flow of sodium chlorate to the top of the column 10.

Sulphur dioxide is supplied to the inlet 14 at the bottom of column 10 in any suitable manner. For purposes of illustration pure sulphur dioxide may be supplied from a commercial bottle 38 under constant head as established by a bubbler 40, through a flow meter indicated at 42, through suitable tubing 44 into a mixing bottle 46. The rate of flow of sulphur dioxide may be controlled by suitable means such as an adjustable valve 48 located ahead of the flow meter 42.

Air is drawn through a flow meter 50 into the mixing bottle 46. The rate of flow of air is determined by the suction on the system, and this in turn depends upon the adjustment of a valve 52 located at the top of an absorption column 54.

The apparatus just described supplies an adjustable flow of a mixture of sulphur dioxide and air in which the concentration of sulphur dioxide may be adjusted to suitable value by manipulation of the valve 48 with regard to the amount of suction on the system.

In the illustrated embodiment of the invention the mixture of sulphur dioxide and air is introduced to the reaction column through the inlet 14 at the lower end thereof. This gas thus flows through the column 10 countercurrently to the sodium chlorate solution supplied through the inlet 18. The gaseous mixture resulting from the reaction of the sulphur dioxide upon the sodium chlorate in the packed column will leave the same through the outlet 20 and it may be conducted through a tube 55 to an inlet 56 provided at the bottom of the absorption column 54.

The absorption column 54 may be very similar to the reaction column 10 except that it is not necessary to provide this column with a water jacket. Preferably it is packed with Raschig rings or other suitable packing material 58. At its upper end the absorption column 54 is provided with an inlet 60 through which water is introduced at a rate of flow determined by adjustment of a valve 62. The gas leaving the top of the absorption column is drawn through a tube 64 by action of a suitable vacuum pump 66 which exhausts to the atmosphere.

At its lowermost end the absorption column 54 is provided with a valve 68 from which the solution 70 may be withdrawn.

Suitable manometers 72, 74 and 76 may be provided to determine the pressure drop across the reaction column 10 and the absorption column 54.

A general description of the operation of our invention upon the illustrative apparatus just described will now be given.

The valve 36 is opened rather widely to cause the flow of a substantial quantity of sodium chlorate into the apparatus. When the column packing 12 has been thoroughly wetted and preferably when a slightly flooded condition is observed the sulphur dioxide may be admitted to the apparatus. As described above, the gas thus admitted is a mixture of sulphur dioxide and air, or in other embodiments may comprise chiefly sulphur dioxide and nitrogen as in the product of sulphur burners. A concentration of sulphur dioxide not over twenty per cent (20%) by volume is advisable to obviate danger of explosion. In any event, a suitably diluted sulphur dioxide mixture is introduced at the bottom of the reaction column 10. As this gas flows upwardly it will react with the sodium chlorate to produce chlorine dioxide and chlorine as described above. The rate of flow of sodium chlorate is then reduced to the desired rate and preferably this rate is such as to keep the packing thoroughly wetted without flooding. The rate of flow of the sulphur dioxide is then adjusted either (a) in accordance with visual observation of the location where greatest reaction occurs or (b) by measuring the temperature at various points in the column, the maximum temperature indicating where greatest reaction occurs, or (c) in accordance with analysis of effluent gas and liquor from the reaction column 10. The main reaction zone is indicated by a rather strong yellow color, and if it is desired to produce a mixture of chlorine dioxide and chlorine the flow of sulphur dioxide is so adjusted that the strongest yellow color is observed about midway of the height of the column and no yellow color is observed at or near the bottom of the packed portion thereof. Obviously, if it is desired to reduce the proportion of chlorine present it will be necessary to increase the rate of flow of sulphur dioxide as described above.

The higher the concentration of the sodium chlorate solution introduced at the top of the column the higher is the yield of chlorine dioxide per unit weight of chlorate. However, if the solution is supplied to the column in too high a concentration the effluent solution becomes supersaturated with respect to sodium sulphate or sodium acid sulphate and crystallization may occur within the column. This tendency is enhanced by the cooling effect of the entering gas which evaporates water from the solution descending the column. This condition may be partially offset by saturating the sulphur dioxide gaseous mixture with water vapor, but we have discovered a novel way of offsetting this condition to such an extent that very high concentrations of sodium chlorate may be used, thus increasing the efficiency of this apparatus to a great extent.

The reaction between sodium chlorate and sulphur dioxide produces heat. The upper part of the reaction column 10, particularly the part in which the yellow color discussed above is the strongest, becomes quite hot. While we have observed that the temperature rise in this zone is not so great as to go beyond the limit to which chlorine dioxide gas of the concentration produced here may be safely handled, nevertheless this high temperature tends to dissociate part of the chlorine dioxide into chlorine and oxygen.

Thus the heat produced in the upper part of the column tends to reduce the efficiency of operation and, as previously discussed, the tendency toward supersaturation of the effluent liquor requires that sodium chlorate solutions of less than optimum concentration be used. We have found that both of these deficiencies may be overcome by circulating water within the jacket 22 from the top of the column to the bottom thereof. This procedure enables us to cool the column in the zone of greatest reaction, thus reducing the tendency toward dissociation of the chlorine dioxide and to carry the heated cooling water downwardly whereby to heat the lower portion of the column in which added heat is of decided advantage for prevention of crystallization. This latter effect is due, of course, to the increase in solubility of sodium sulphate and sodium acid sulphate due to an increase in temperature.

Circulation of water within the jacket 22 may be effected by suitable tubing 78 and a pump 80 through which the water moves in the direction of the arrow 82. We have found that for commercial operation more heat is produced by the reaction than is needed to prevent crystallization at the bottom of the tower and thus a small heat exchanger 84 may be provided through which water is circulated at a suitable rate to maintain the temperature of the water in the column jacket at desired value.

The mixture of gases leaving the top of the reaction column 10 through the outlet 20 is conducted through tube 55 into the inlet 56 of the absorption column 54. The gases are then drawn upwardly through the absorption column 54 countercurrently to the water introduced at the inlet 60 at the top of the absorption column.

The valve 62 is adjusted to establish desired rate of flow of water to the absorption column and it will be recognized that this rate is not particularly critical, it being necessary only to supply sufficient water to insure absorption of all of the gas and preferably to prevent flooding of the absorption column.

The aqueous solution 70 is withdrawn from the bottom of the absorption column 54 and may be conducted in any suitable manner to the point of use. One particular advantage of the method and apparatus disclosed herein lies in the fact that the aqueous solution 70 is discharged at a steady rate of flow proportioned to the flow of water into the top of the column, and thus a constant flow of the aqueous solution may be supplied to a processing operation requiring the same.

As discussed above, a constant supply of an aqueous solution containing a predetermined amount of chlorine dioxide is of particular value in a processing industry such as the preparation of dissolving pulp from a pulpwood source. In some instances with particular types of pulpwood and with particular objectives in view it may be desired to supply an aqueous solution containing a mixture of chlorine dioxide and chlorine, and our apparatus may be operated to establish such supply in accordance with the general discussion above and the specific examples hereinbelow. In other instances it may be desired to reduce the relative amount of chlorine present in such aqueous solution or substantially to eliminate chlorine from such solution. These latter results may be achieved in accordance with our process and specific examples of such operation will be set forth hereinbelow.

In certain other instances the use of aqueous solutions of the types above discussed may be undesirable, and in connection therewith our process and apparatus may be employed to produce a gaseous mixture containing chlorine dioxide substantially free from chlorine or containing a mixture of chlorine dioxide and selectively controlled amounts of chlorine.

The following specific examples have been selected as characteristic of operation of our apparatus in accordance with our process to achieve the various results discussed in general terms in the above description. It will be appreciated that since such examples are of illustrative nature the scope of our invention is not to be construed as limited to such specific examples and that modification and variations may be resorted to by those skilled in the art within the scope of the appended claims.

In the following examples we describe operation of our apparatus with an aqueous solution of sodium chlorate. Because of its solubility characteristics, commercial availability and relatively low cost sodium chlorate is preferred. However, any other chlorate which is sufficiently soluble in water may be adapted to our process without difficulty. Thus magnesium, lithium or aluminum chlorate are sufficiently soluble to lend themselves to use in our apparatus and process, while potassium chlorate is not sufficiently soluble to obtain a good yield of chlorine dioxide when the present cost of potassium chlorate is taken into consideration. It will be appreciated, however, that the selection of the most desirable chlorate for use in our process is largely a matter of a balance between cost and solubility and that changes in market condition may well render any of the chlorates discussed above highly desirable in our process. Calcium chlorate is sufficiently soluble for use in our process but calcium sulphate is insoluble and accordingly, if it were attempted to use calcium chlorate in our process the calcium sulphate produced in the reaction column would be expected to plug the column.

Example 1.—Aqueous sodium chlorate solution (690 grams per litre) was run into the reaction tower at the rate of 990 cc. per hour, while $SO_2$, diluted with air to 14.8% by volume concentration, was introduced at the rate of 675 grams $SO_2$ per hour. Chlorine dioxide was produced at the rate of 282 grams per hour, a yield of 68.0% of the theoretical based on chlorate. The product contained chlorine dioxide and chlorine in the ratio of 93.3% chlorine dioxide to 6.7% chlorine by weight, or about 14:1.

Example 2.—Aqueous sodium chlorate solution (690 grams per litre) was run into the reaction tower at the rate of 675 cc. per hour, and $SO_2$, diluted with air to 15.4% by volume concentration, was introduced at the rate of 490 grams $SO_2$ per hour. Chlorine dioxide was produced at the rate of 207 grams per hour, a yield of 73.3% of the theoretical based on chlorate. The product contained chlorine dioxide and chlorine in the ratio of 93.9% chlorine dioxide and 6.1% chlorine by weight, or 15.4:1.

Example 3.—Aqueous sodium chlorate solution (690 grams per litre) was run into the reaction tower at the rate of 527 cc. per hour, while $SO_2$, diluted with air to a concentration of 15.4% by volume, was introduced at the rate of 354 grams $SO_2$ per hour. Chlorine dioxide was produced at the rate of 154 grams per hour, a yield of 69.3% of the theoretical based on chlorate. The reactive gases in the product contained chlorine dioxide and chlorine in the ratio of 92.0% chlorine dioxide to 8.0% chlorine by weight, or about 11.5:1.

Example 4.—Aqueous sodium chlorate solution (690 grams per litre) was run into the reaction tower at the rate of 880 cc. per hour, while $SO_2$, diluted with air to 14.8% by volume concentration, was introduced at the rate of 675 grams $SO_2$ per hour. Chlorine dioxide was produced at the rate of 258 grams per hour, or 70.3% of the theoretical yield based on chlorate. Acid was carried over into the absorption tower at the rate of 154 grams per hour as sulphuric acid. The gaseous product contained at most only a trace of chlorine, about 1 part by weight to 330 parts of chlorine dioxide.

Example 5.—Aqueous sodium chlorate solution (690 grams per litre) was run in at the rate of 830 cc. per hour, while $SO_2$, diluted with air to 14.8% concentration, was introduced at the rate of 675 grams $SO_2$ per hour. Chlorine dioxide substantially free from chlorine was produced at the rate of 211 grams per hour, a yield of 60.6% of the theoretical based on chlorate. Acid was produced at the rate of 194 grams per hour as sulphuric acid.

Example 1 illustrates operation of our apparatus with balanced amounts of chlorate and $SO_2$. Under such conditions the aqueous solution of gases contains some chlorine but very little acid. It will be noted that the ratio of chlorine dioxide to chlorine is 14:1 and that such ratio is very much higher than that achieved in the operation of processes and apparatus disclosed in the prior art. This example therefore illustrates the particular efficiency of our apparatus in achieving a high yield of chlorine dioxide with a relatively small quantity of chlorine.

In Examples 2 and 3 we illustrate operation of our apparatus at less than its full capacity, and it should be pointed out that even under such conditions there is very little change in the proportion of chlorine dioxide to chlorine. It is thus apparent that the production rate of our apparatus may be adjusted to suit a specific demand of a processing industry in which the apparatus is to be used without substantial loss in efficiency. This feature is particularly valuable in connection with a processing industry in which the bleaching or treating demands are likely to change from time to time.

Example 4 is illustrative of the operation of our apparatus with a slight excess of $SO_2$ in order to produce chlorine dioxide free from chlorine. The resulting aqueous solution contains a certain amount of acid, as indicated in the example, but in certain processing industries it may be preferred to make use of an aqueous solution containing such small amount of acid, but containing no chlorine, to the use of a solution relatively free of acid but containing some free chlorine.

In Example 5 the apparatus was operated with a large excess of $SO_2$. Such operation produces an aqueous solution of chlorine dioxide substantially free from chlorine, as in Example 4, but it will be noted that the yield is less due to the lowering of efficiency resulting from reaction between the excess $SO_2$ and the chlorine dioxide. The amount of acid contained in the aqueous solution is, as might be expected, larger than in the operation illustrated in Example 4. Examples 4 and 5 are thus illustrative of the flexibility of our apparatus and of the preferred operation when it is desired to produce chlorine dioxide substantially free from chlorine.

We claim:

1. A continuous process for the production of gaseous chlorine dioxide by the reaction between gaseous sulphur dioxide and an aqueous solution of a metallic chlorate, consisting in the steps of supplying a continuous stream of an aqueous solution of a metallic chlorate to a packed reaction column at such a rate as to distribute said aqueous chlorate solution over the surfaces of the packing in said reaction column, countercurrently supplying a continuous stream of gaseous sulphur dioxide and an inert diluent gas to said reaction column to bring said sulphur dioxide into contact with the surface of the aqueous chlorate solution distributed over the packing in said column, employing a heat exchanging medium to cool said packed column in the zone of greatest reaction, continuously moving said heat exchanging medium along said packed column from the zone of greatest reaction to the zone of efflux of spent liquor whereby to transfer heat from said first zone to said second zone, and continuously withdrawing from said reaction column a gaseous mixture containing chlorine dioxide and said inert diluent gas.

2. A continuous process for the production of gaseous chlorine dioxide by the reaction between gaseous sulphur dioxide and an aqueous solution of sodium chlorate, consisting in the steps of supplying a continuous stream of an aqueous solution of sodium chlorate to a packed reaction column at such a rate as to distribute said aqueous chlorate solution over the surfaces of the packing in said reaction column, countercurrently supplying a continuous stream of gaseous sulphur dioxide and an inert diluent gas to said reaction column to bring said sulphur dioxide into contact with the surface of the aqueous chlorate solution distributed over the packing in said column, employing a heat exchanging medium to cool said packed column in the zone of greatest reaction, continuously moving said heat exchanging medium along said packed column from the zone of greatest reaction to the zone of efflux of spent liquor whereby to transfer heat from said first zone to said second zone, and continuously withdrawing from said reaction column a gaseous mixture containing chlorine dioxide and said inert diluent gas.

3. A continuous process for the production of an aqueous solution of chlorine dioxide substantially free from chlorine by the reaction between gaseous sulphur dioxide and an aqueous solution of a metallic chlorate, consisting in the steps of continuously supplying an aqueous solution of a metallic chlorate to a packed reaction column in such manner as to distribute a film of said aqueous chlorate solution on the surfaces of the packing in said reaction column, continuously and countercurrently supplying gaseous sulphur dioxide and an inert diluent gas to said reaction column to bring said sulphur dioxide into contact with the surface of the film of said aqueous chlorate solution, the quantity of sulphur dioxide thus introduced being greater than that which will react with said aqueous chlorate solution to produce chlorine dioxide and chlorine, withdrawing from said reaction column a gaseous mixture containing chlorine dioxide and said inert diluent gas and being substantially free from chlorine, introducing said last named gaseous mixture to a packed absorption column, continuously supplying water to said absorption column to distribute a film of water over the packing thereof, and withdrawing from said absorption column an aqueous solution containing chlorine dioxide, sulphuric acid and hydrochloric acid and being substantially free from chlorine.

4. A continuous process for the production of an aqueous solution of chlorine dioxide substantially free from chlorine by the reaction between gaseous sulphur dioxide and an aqueous solution of a metallic chlorate, consisting in the steps of continuously supplying an aqueous solution of a metallic chlorate to a packed reaction column in such manner as to distribute a film of said aqueous chlorate solution on the surfaces of the packing in said reaction column, continuously and countercurrently supplying gaseous sulphur dioxide and an inert diluent gas to said reaction column to bring said sulphur dioxide into contact with the surface of the film of said aqueous chlorate solution, the quantity of sulphur dioxide thus introduced being greater than that which will react with said aqueous chlorate solution to produce chlorine dioxide and chlorine, employing a heat exchanging medium to cool said packed column in the zone of greatest reaction, continuously moving said heat exchanging medium along said packed column from the zone of greatest reaction to the zone of efflux of spent liquor whereby to transfer heat from said first zone to said second zone, withdrawing from said reaction column a gaseous mixture containing chlorine dioxide and said inert diluent gas and being substantially free from chlorine, introducing said last named gaseous mixture to a packed absorption column, continuously supplying water to said absorption column to distribute a film of water over the packing thereof, and withdrawing from said absorption column an aqueous solution containing chlorine dioxide, sulphuric acid and hydrochloric acid and being substantially free from chlorine.

5. A continuous process for the production of an aqueous solution of chlorine dioxide substantially free from chlorine by the reaction between gaseous sulphur dioxide and an aqueous solution of sodium chlorate, consisting in the steps of continuously supplying an aqueous solution of sodium chlorate to a packed reaction column in such manner as to distribute a film of said aqueous chlorate solution on the surfaces of the packing in said reaction column, continuously and countercurrently supplying gaseous sulphur dioxide and an inert diluent gas to said reaction column to bring said sulphur dioxide into contact with the surface of the film of said aqueous chlorate solution, the quantity of sulphur dioxide thus introduced being greater than that which will react with said aqueous chlorate solution to produce chlorine dioxide and chlorine, employing a heat exchanging medium to cool said packed column in the zone of greatest reaction, continuously moving said heat exchanging medium along said packed column from the zone of greatest reaction to the zone of efflux of spent liquor whereby to transfer heat from said first zone to said second zone, withdrawing from said reaction column a gaseous mixture containing chlorine dioxide and said inert diluent gas and being substantially free from chlorine, introducing said last named gaseous mixture to a packed absorption column, continuously supplying water to said absorption column to distribute a film of water over the packing thereof, and withdrawing from said absorption column an aqueous solution containing chlorine dioxide, sulphuric acid and hydrochloric acid and being substantially free from chlorine.

6. A continuous process for the production of chlorine dioxide substantially free from chlorine by the reaction between gaseous sulphur dioxide and an aqueous solution of a metallic chlorate, consisting in the steps of continuously supplying an aqueous solution of a metallic chlorate to a packed reaction column in such a manner as to distribute a film of said aqueous chlorate solution on the surfaces of the packing in said reaction column, continuously and countercurrently supplying gaseous sulphur dioxide and an inert diluent gas to said reaction column to bring said sulphur dioxide into contact with the surface of the film of said aqueous chlorate solution, the quantity of sulphur dioxide thus introduced being greater than that which will react with said aqueous chlorate solution to produce chlorine dioxide and chlorine, employing a heat exchanging medium to cool said packed column in the zone of greatest reaction, continuously moving said heat exchanging medium along said packed column from the zone of greatest reaction to the zone of efflux of spent liquor whereby to transfer heat from said first zone to said second zone, and withdrawing continuously from said reaction column a gaseous mixture containing chlorine dioxide and said inert diluent gas and being substantially free from chlorine.

7. A continuous process for the production of gaseous chlorine dioxide by the reaction between gaseous sulphur dioxide and an aqueous solution of a metallic chlorate, consisting in the steps of supplying a continuous stream of an aqueous solution of a metallic chlorate to a packed reaction column at such a rate as to distribute said aqueous chlorate solution over the surfaces of the packing in said reaction column, countercurrently supplying a continuous stream of gaseous sulphur dioxide and an inert diluent gas to said reaction column to bring said sulphur dioxide into contact with the surface of the aqueous chlorate solution distributed over the packing in said column, cooling said packed column in the zone of greatest reaction, heating said column in the zone of efflux of the spent liquor and continuously withdrawing from said column a gaseous mixture containing chlorine dioxide and said inert diluent gas.

8. A continuous process for the production of a mixture of chlorine dioxide and chlorine by the reaction between gaseous sulphur dioxide and an aqueous solution of a metallic chlorate, consisting in the steps of supplying a continuous stream of an aqueous solution of a metallic chlorate to a packed reaction column at such a rate as to distribute said aqueous chlorate solution over the surfaces of the packing in said reaction column, countercurrently supplying a continuous stream of gaseous sulphur dioxide and an inert diluent gas to said reaction column to bring said sulphur dioxide into contact with the surface of the aqueous chlorate solution distributed over the packing in said column, cooling said packed column in the zone of greatest reaction, heating said column in the zone of efflux of the spent liquor, and continuously withdrawing from said column a gaseous mixture containing chlorine dioxide, chlorine and said inert diluent gas.

WILLIAM HOWARD RAPSON.
MORRIS WAYMAN.

REFERENCES CITED

The following references are of record in the file of this patent:

UNITED STATES PATENTS

| Number | Name | Date |
| --- | --- | --- |
| 1,294,546 | Sherwin | Feb. 18, 1919 |
| 1,510,790 | McElroy | Oct. 7, 1924 |
| 2,078,045 | Vincent | Apr. 20, 1937 |
| 2,089,913 | Cunningham | Aug. 10, 1937 |
| 2,119,721 | Richardson | June 7, 1938 |
| 2,373,830 | Holst | Apr. 17, 1945 |